April 15, 1952  N. SKILLMAN, JR., ET AL  2,593,208
SPRING PAD AND COVER
Filed May 19, 1950 2 SHEETS—SHEET 2
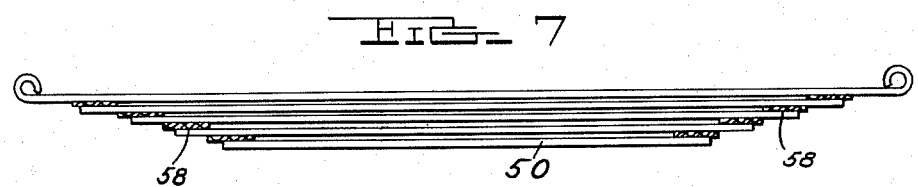
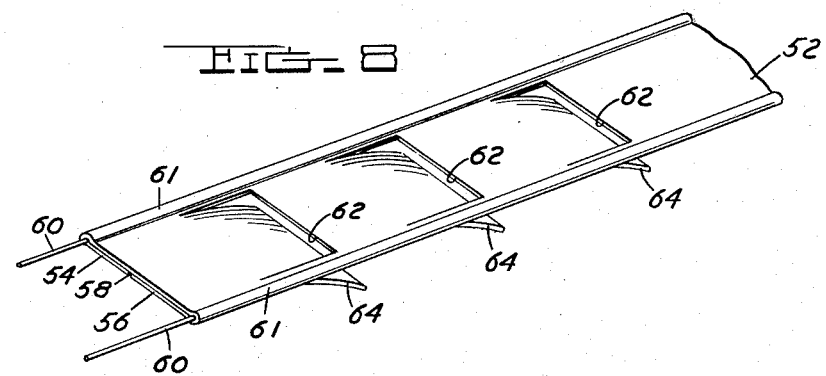
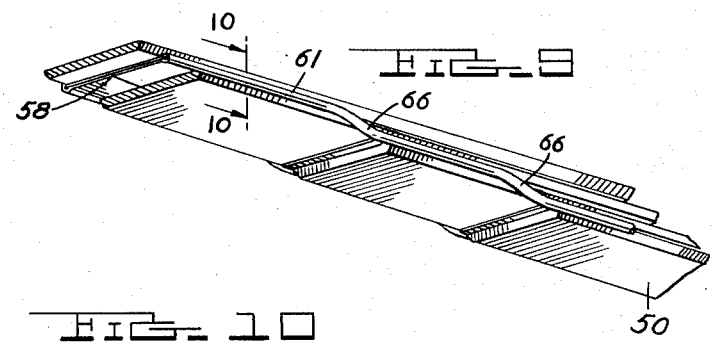
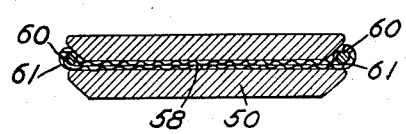
INVENTORS
NEWTON SKILLMAN JR.
JOHN E. CONNOLLY
BY
*Barnes, Kisselle, Laughlin & Raisch*
ATTORNEYS Patented Apr. 15, 1952

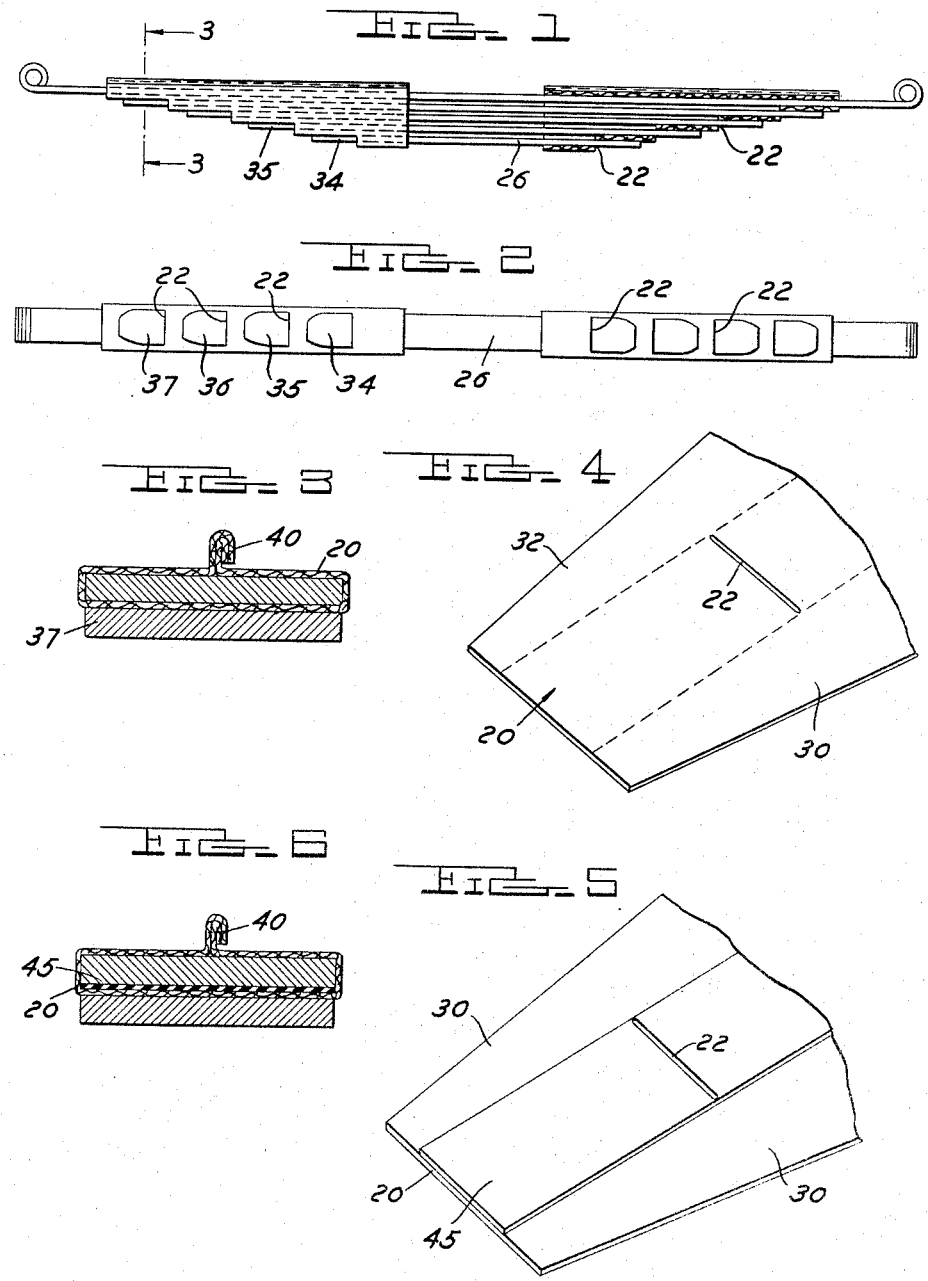

2,593,208

UNITED STATES PATENT OFFICE 2,593,208

SPRING PAD AND COVER

Newton Skillman, Jr., and John E. Connolly, Detroit, Mich., assignors to Neveroil Products Company, Hamburg, Mich., a corporation of Michigan Application May 19, 1950, Serial No. 162,981

11 Claims. (Cl. 267—50)

1

This invention relates to a spring pad and cover.

In recent years it has been common in vehicle construction to provide canvas or other fabric, metal or composition covers for leaf spring assemblies to retain the lubrication therein and also keep out moisture and dirt, thus insuring a quiet, well-lubricated spring action. As a method of reducing cost, there has been a trend toward removal of the spring covers and the insertion of spring pads between the ends of the leaf springs.

The present invention contemplates a combination spring pad and cover which will serve not only to protect the spring against moisture and dirt and any other foreign matter that may cause damage or shorten the life of the spring but will also serve as a spring pad, thus combining the good features of the spring cover and the spring pad.

Briefly, this is accomplished by forming a fabric member with suitable openings that it might be wrapped around the spring, and portions thereof may be inserted through spaced slots between the ends of the springs, thus providing the spring pad. In some instances the entire cover may be made from a lubricant impregnated material. In other instances the spring pad may be formed of an insert positioned within and formed to a water-proof cover material.

It is an object of the invention to provide a relatively inexpensive unit which will serve to exclude dirt from the sliding portions of the spring and have the added advantage of a spring pad properly located and retained and properly lubricated.

Drawings accompany the specification, and the various views thereof may be briefly described as:

Figure 1, an elevation of a leaf spring assembly showing a combination spring pad and cover in position.

Figure 2, a bottom view of the assembly shown in Figure 1.

Figure 3, a sectional view on line 3—3 of Figure 1.

Figure 4, a view of the spring pad and cover prior to assembly.

Figure 5, a view of a modified type of spring pad in which a lubricant impregnated fabric insert is used.

Figure 6, a sectional view similar to that of Figure 3 illustrating the use of the modification of Figure 5.

Figure 7, an elevation of a spring assembly illustrating the application of a second modified type of spring pad.

Figure 8, a perspective elevation of the spring pad used in Figure 7.

2

Figure 9, a perspective view of the assembly shown in Figure 7 illustrating the relative location of the parts.

Figure 10, a sectional view on line 10—10 of Figure 9.

In the disclosure and claims the term "leaf spring assembly" shall be applied to a plurality of leaf springs stacked vertically; that is, superimposed one on the other and having progressively decreasing lengths.

Referring to the drawings, the unit shown in Figures 1 to 6 is primarily a sheet of canvas duck 20, the center portion of which is provided with spaced slits 22 extending transversely of the material and having the width of a spring leaf. These slits 22 are spaced from each other at regular intervals which correspond to the spacing of the ends of the spring leaves in a spring assembly 26 as shown in Figure 1.

On either side of the central portion of the strip 20 are side flaps 30 and 32 which increase in width progressively from the small outer end to the large inner end. In applying the unit to the spring the ends of the spring leaves, respectively shown 34 to 37, are passed through the slits 22 and at the sides of the unit are drawn up and around the spring leaf assembly and stapled together at 40.

In some cases the entire strip is impregnated with a lubricant such as that disclosed in Delp Patent No. 2,379,478, and at any rate the material which is to be confined between the spring sections is impregnated with this compound or a similar compound.

It is desirable also to coat the outer surface of the combination spring interleaf unit and spring cover with rubberized compound to render the same water-proof and to extend its life against the weathering elements to which it will be subjected.

In Figures 5 and 6 a unit similar to that shown in Figures 1 to 4 is illustrated except that an additional friction member or strip 45 is applied to the central portion of the spring interleaf unit. This member 45 may be also an impregnated fabric and may be bonded or attached to the central portion of the strip 20 by some suitable means such as a thermo-setting adhesive known as Scotchweld, sold by the Minnesota Mining Company. This material is sold both in sheet form and in liquid form. The unit shown in Figure 5 is shown also in assembly in Figure 6 in a view similar to that shown in Figure 3.

In Figure 7 a modified type of spring cover and interleaf unit is shown. The spring assembly is shown in Figure 7 at 50 and in Figure 8 the combination unit is shown, which consists of a strip of fabric 52 such as cotton duck which has sides 54 and 56 folded back upon the material to form a center seam 58. In the folds of the material, at the edge, as shown in Figure 8, a strip of wire 60 is shown to provide a welt edge 61. This wire 60 may also be a cotton cord or paper cord or other similar elongate filler. Also the strip may be woven in this shape if desired with preformed edge welts. The overlapping layers of the fabric are joined together by a thermo-setting adhesive or suitable bonding medium as above described.

As shown in Figure 8 the composite strip is then provided with three-sided cuts 62 which actually form tongues 64 in the material spaced at suitable intervals and lying between the welt edges.

This unit is assembled as shown in Figures 9 and 10 so that the welt edges 61 lie along the openings between the contacting surfaces of the spring assembly. As shown in Figure 10 a section of spring is used with angled sides and the welted edges 61 lie closely into the grooves formed by this section between the springs. However, any other spring section is satisfactory.

The ends of the respective spring leaves project through the openings formed by the cuts 62, and the strip is thus confined at respective portions between the slits in the spring leaf assembly. The tongue-like projections of the unit permit the welt edges 61 to follow the contour of the spring as shown at 66, that is, they form jogs in the welt so that it may progress downwardly from leaf to leaf without a sharp strain on the welted edge.

This unit also is impregnated throughout with a lubricant and provides, therefore, a friction control as well as side seal for the spring unit. It will be possible to apply a single strip of the material to a single spring assembly so that the two ends of the material are provided with the openings to receive the respective ends of the spring interleaf. This will hold the unit against endwise displacement and provide an easy assembly unit.

However, the single end unit is desirable since it is cheaper and more easily installed. The shorter springs will clamp the unit against endwise displacement since between the shorter springs there is very little displacement movement.

It will thus be seen that there is provided a spring interleaf unit which is self-retaining due to the spring construction and one which simultaneously serves as a spring protector.

What we claim is:

1. Means for producing a more constant coefficient of friction between the contacting ends of leaf springs and for reducing noise and protecting the frictional surfaces of such springs used in a leaf spring assembly which comprises a strip of flexible material characterized by an ability to absorb and retain lubricating material, said strip provided with transverse slits at intervals along its length spaced to receive the ends of the respective leaves of the assembly, and means at the side of the strip to position it against lateral displacement, a lubricant impregnated into said strip, said strip between the slits being interposed between the leaves to provide a spacer.

2. A spring interleaf strip as defined in claim 1 in which the means at the side comprises side flap extensions of the slit strip drawn up and around the spring assembly and fastened together.

3. A spring interleaf strip as defined in claim 1 in which the means at the side comprises a reinforcing elongate member covered and retained by the strip.

4. A spring interleaf strip as defined in claim 1 to control friction and noise between the leaves of a leaf spring assembly in which the side flaps on either side of said slits increase progressively in width from one end to be drawn up and around the spring assembly and fastened together.

5. A spring interleaf strip as defined in claim 1 to control friction and noise between the leaves of a leaf spring assembly in which the strip between the slits comprises a double thickness of woven lubricant impregnated fabric bonded together with a suitable adhesive.

6. A spring interleaf strip as defined in claim 5 in which the means at the side comprises a reinforcing elongate member covered and retained by the strip.

7. A spring interleaf as defined in claim 1 in which means at the side comprises side flap extensions drawn up and around the spring assembly and fastened together, and a coating of water-proofing material on said flaps.

8. A spring interleaf strip to control friction and noise between the leaves of a leaf spring assembly which comprises a strip of woven fabric having each side doubled back to join at the center of the strip, elongate means confined at the folded edges of the doubled strip, a suitable adhesive joining the layers of fabric, said strip within the folded edges being slit transversely at spaced intervals to receive the respective ends of a leaf spring assembly whereby a portion of the strip is confined between each spring end and an adjacent leaf.

9. A spring interleaf strip to control friction as defined in claim 8 in which the confined portions of the strip are impregnated with a lubricant.

10. A spring interleaf strip and protector for multiple leaf springs which comprises a strip of woven fabric shaped to protect the joints between spring leaves and means projecting from said strip at spaced intervals longitudinally to lie between adjacent spring leaves, said projecting means being impregnated with a lubricating material.

11. A spring interleaf strip to control friction and noise between the leaves of a leaf spring assembly which comprises a strip of woven fabric impregnated with a lubricant shaped at the sides to close the joints between spring leaves and means projecting toward one end of said strip centrally thereof and spaced longitudinally to be confined between the ends of spring leaves and the respective adjacent leaves to serve as interleaf pads, said means being impregnated with a lubricant.

NEWTON SKILLMAN, JR.
JOHN E. CONNOLLY.

REFERENCES CITED

The following references are of record in the file of this patent:

UNITED STATES PATENTS

| Number | Name | Date |
|---|---|---|
| 1,373,527 | Priestley | Apr. 5, 1921 |
| 1,808,259 | Schemmel | June 2, 1931 |
| 2,338,480 | Auxier | Jan. 4, 1944 |
| 2,377,216 | Duckoff | May 29, 1945 |